United States Patent
Ellerbrock et al.

(10) Patent No.: US 7,174,402 B2
(45) Date of Patent: *Feb. 6, 2007

(54) SYSTEMS, NETWORK DEVICES AND METHODS FOR HIGHLY CONFIGURABLE PEER-TO-PEER COMMUNICATIONS BETWEEN NETWORK DEVICES COMMUNICATING VIA A COMMON BUS

(75) Inventors: Philip J. Ellerbrock, St. Peters, MO (US); Joseph P. Winkelmann, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 525 days.

This patent is subject to a terminal disclaimer.

(21) Appl. No.: 10/408,404

(22) Filed: Apr. 7, 2003

(65) Prior Publication Data

US 2004/0199691 A1    Oct. 7, 2004

(51) Int. Cl.
*G06F 13/00* (2006.01)
*G06F 12/00* (2006.01)

(52) U.S. Cl. ............... 710/112; 710/302; 710/100; 710/107; 711/114

(58) Field of Classification Search ................. 710/316
See application file for complete search history.

(56) References Cited

U.S. PATENT DOCUMENTS

| | | | |
|---|---|---|---|
| 4,304,001 A | 12/1981 | Cope | |
| 4,451,881 A | * 5/1984 | Grice et al. | ............. 710/120 |
| 4,602,327 A | * 7/1986 | LaViolette et al. | ......... 710/107 |
| 4,688,168 A | 8/1987 | Gudaitis et al. | |
| 4,942,571 A | 7/1990 | Möller et al. | |
| 4,996,684 A | 2/1991 | Morley et al. | |
| 5,138,709 A | 8/1992 | Jones et al. | |

(Continued)

FOREIGN PATENT DOCUMENTS

WO    WO 99/63409    12/1999

(Continued)

OTHER PUBLICATIONS

Infineon: *C167CR 16-Bit Single-Chip Microcontroller*; Apr. 2000; 72 pages; XP-002201995; Published by Infineon Technologies AG.

(Continued)

*Primary Examiner*—Rehana Perveen
*Assistant Examiner*—Brian Misiura
(74) *Attorney, Agent, or Firm*—Alston & Bird LLP (57) ABSTRACT

A system and method are provided for initiating peer-to-peer communications via a network bus. The system includes a bus controller in electrical communication with the network bus for controlling communications on the network bus, such as by transmitting commands onto the network bus. The system also includes at least one network device in electrical communication with the network bus, where the network devices collectively comprise at least first and second data channels. The first data channel is configured for Surrogate operation and includes an initiator command and a surrogate command. When the bus controller transmits a command onto the network bus that matches the initiator command of at least the first data channel, at least the second data channel is capable of executing the initiator command and at least the first data channel is capable of executing the respective surrogate command.

36 Claims, 6 Drawing Sheets

U.S. PATENT DOCUMENTS

| | | |
|---|---|---|
| 5,223,806 A | 6/1993 | Curtis et al. |
| 5,274,783 A | 12/1993 | House et al. |
| 5,367,678 A | 11/1994 | Lee et al. |
| 5,437,060 A | 7/1995 | Delamater et al. |
| 5,445,128 A | 8/1995 | Letang et al. |
| 5,615,404 A | 3/1997 | Knoll et al. |
| 5,623,610 A | 4/1997 | Knoll et al. |
| 5,694,555 A | 12/1997 | Morriss et al. |
| 5,737,356 A | 4/1998 | Harrison et al. |
| 5,742,847 A | 4/1998 | Knoll et al. |
| 5,754,548 A * | 5/1998 | Hoekstra et al. ............ 370/402 |
| 5,801,602 A | 9/1998 | Fawal et al. |
| 5,909,556 A | 6/1999 | Morriss et al. |
| 5,978,875 A | 11/1999 | Asano et al. |
| 6,195,724 B1 | 2/2001 | Stracovsky et al. |
| 6,273,771 B1 | 8/2001 | Buckley et al. |
| 6,353,877 B1 * | 3/2002 | Duncan et al. ............. 711/155 |
| 6,452,928 B1 | 9/2002 | Fawal et al. |
| 6,591,324 B1 * | 7/2003 | Chen et al. ................ 710/302 |
| 6,600,971 B1 * | 7/2003 | Smith et al. ................ 700/284 |
| 6,654,853 B1 * | 11/2003 | Gates et al. ................ 711/114 |
| 6,708,239 B1 * | 3/2004 | Ellerbrock et al. ........... 710/62 |
| 2003/0041141 A1 * | 2/2003 | Abdelaziz et al. .......... 709/223 |
| 2004/0019725 A1 * | 1/2004 | Ellerbrock et al. ......... 710/305 |

FOREIGN PATENT DOCUMENTS

WO      WO 02 46938 A      6/2002

OTHER PUBLICATIONS

Tobias Wenzel; Infineon: *CAN Baudrate Detection with Infineon CAN Devices*; Jul. 1999, 11 pages; XP-002201996.

H. Kopetz; *TTP/A Protocol—Specification of the TTP/A Protocol*; TTTech Computertechnik AG, Time-Triggered Technology; May 16, 2001; pp. 1-35; XP-002254182.

H. Kopetz, G. Grunsteidl; *TTP—A Time-Triggered Protocol for Fault-Tolerant Real-Time Systems*; Fault-Tolerant Computing; FTCS-23; Digest of Papers, the Twenty-Third International Symposium on Toulouse, France Jun. 22-24, 1993, Los Alamitos, California; 1993; pp. 524-533; XP010251368; ISBN: 0-8186-3680-7.

T.W. Martin; *1394: High-Performance Serial Bus for Desktop and Portable Computers*; Computer Technology Review; 1994; pp. 46-49; Supplement No. 6, vol. 14; XP000451486; ISSN: 0278-9647; Westworld Production Co., Los Angeles, California.

* cited by examiner

SYSTEMS, NETWORK DEVICES AND METHODS FOR HIGHLY CONFIGURABLE PEER-TO-PEER COMMUNICATIONS BETWEEN NETWORK DEVICES COMMUNICATING VIA A COMMON BUS

FIELD OF THE INVENTION

The present invention relates generally to systems and methods for controlling communication on a network bus and, more particularly, to systems and methods for highly configurable peer-to-peer communications between network devices communicating via a common bus.

BACKGROUND OF THE INVENTION

As systems, such as the multimedia entertainment, communications, process control, and diagnostic systems utilized by the automotive and aerospace industries, become more complex, a need arises for additional devices to communicate, either with each other or with a central controller or the like. Historically, these systems included dedicated wiring extending between the various devices in order to support communications therebetween. As systems have become more integrated and the communications requirements have been increased, the amount of dedicated wiring that would be required has become excessively large, both in terms of the space required for the wiring and the cost of the wiring and the attendant installation. Moreover, as the amount of dedicated wiring increases, the overall complexity of the system also generally increases, as well as the likelihood that some portion of the wiring might be damaged or broken during or following installation.

As such, network systems have been developed to provide a common communications path between a plurality of network devices. In automotive and aerospace applications, for example, a network system can be utilized to monitor various components and to collect diagnostic and status information. In this regard, diagnostic and status information relating to the strain, acceleration, pressure and/or temperature to which the various components are subjected may be collected and analyzed.

By way of further example, a network bus architecture is currently being developed to support communications and the delivery of multimedia information to the occupants of a vehicle such as an automobile, minivan, sports utility vehicle, aircraft, boat or the like, or for use in process control applications that could be applied to a system such as a vehicle. Advantageously, this network bus would transport the audio signals, including streaming audio signals, produced by one or more of a radio, a cassette tape player, a compact disc player or the like to selected speakers or headphone jacks throughout the vehicle. Similarly, the network bus may support voice and data communications with a cellular telephone carried by an occupant of the vehicle, as well as communications with a laptop computer, a handheld computing device or the like. In addition, the network bus may transmit video signals, including streaming video signals, from a television receiver, a videocassette recorder or other video source to one or more video monitors. The system may also support process control applications such as automotive engine and transmission control, drive-by-wire, brake-by-wire, passive restraint, and/or collision avoidance systems that require highly reliable fault tolerant systems. Each of these systems could include a multitude of sensors and actuators that can be controlled using the network architecture under development. Further, the network bus system may transport information related to diagnostic performance of the vehicle.

In addition to the variety of devices that are connected to a network bus, one or more controllers are also generally connected to the network bus for sending commands to the various remote devices and receiving data from the remote devices. Among other things, these commands specify the manner in which the various devices are to function including the manner in which the various devices are to transmit information over the network bus.

Traditionally, networks of the type described above have transmitted data in analog format. Unfortunately, analog signals are susceptible to noise introduced into the signals during data transmission. Given that many of the transmitted signals have a low amplitude to start with, this noise can corrupt the signal and decrease the signal to noise ratio to levels that cause loss of resolution in the signal. Further, as many of these network devices are scattered some distance from the controller, the electrical lines connecting the network devices to the controller may be sufficiently long to cause signal degradation due to DC resistance in the wiring.

In light of these shortcomings, it would be advantageous to utilize digital networks. But, many conventional digital networks suffer from a variety of problems themselves. For example, many existing digital networks operate according to complicated protocols which require each network device to have a relatively high level processor, thereby increasing the cost of the network devices. Complicated protocols also introduce overhead into the messages on the bus that is not necessary for data acquisition and control. This overhead can severely limit the number of data samples that can be transmitted on the bus. These networks also have other problems. For example, they generally do not support both acquisition and control, and they typically only support networks that extend over relatively short lengths. Further, these networks typically have bulky network device interfaces, slow network data rates and/or a low network device count. Additionally, many computer systems that include digital networks do not operate in a time-deterministic manner. As such, these computer systems generally lack the capability to schedule a trigger on event command to the network components that repeats or is interpreted and executed with any precision.

Further, some conventional network systems operate in a master/slave configuration, where the bus controller controls all communication on the network bus. In these network systems, the bus controller uses an operation schedule that includes commands related to either one or a group of network devices and the timing for communicating with the network devices. As such, the bus controller mandates all or substantially all timing for communications.

Although placing the bus controller in control of all communications on the network bus is advantageous as it eliminates communication conflicts on the network bus, there may be some drawbacks to this configuration. Specifically, in some instances, it is desirable to move data directly from one or more network devices to other network devices without interdiction from any bus controller, such as in the case of moving streaming audio signals.

To allow for peer-to-peer communication among network devices, some conventional network systems include dedicated wiring between various network devices for providing direct access between the network devices. As stated above, however, an important advantage of network systems is the replacement of dedicated wiring with a common network bus. The requirement of the additional dedicated wiring by the above-described network system is not consistent with this goal and suffers from problems, such as added cost of the wiring and the attendant installation, as well as the likelihood that some portion of the wiring might be damaged or broken during or following installation.

As an alternative to the use of dedicated wiring, other network systems require communications between network devices to proceed through the bus controller. This alternative, however, is also undesirable. Because a constant flow of information is often transmitted by one network device and received by other network devices, the timing of the transfer of information is critical to the success of the transfer. Because transferring information through the bus controller adds an extra element through which the information must travel, it unnecessarily adds time to the overall information transfer.

SUMMARY OF THE INVENTION

In light of the foregoing background, the various embodiments of the present invention provides systems, network devices and methods for initiating peer-to-peer communications in a network in a manner more efficient than conventional network systems. Embodiments of the systems, network devices and methods of the present invention allow data channels of network devices to communicate in a peer-to-peer fashion via a common network bus without dedicated wiring, as some conventional network systems require. Additionally, embodiments of the systems, network devices and methods of the present invention allow data channels of network devices to communicate without interdiction from a bus controller. Also, advantageously, embodiments of the systems, network devices and methods of the present invention allow the network devices to configure how the data channels respond to certain commands on the network bus, which response may differ from the expected response from the command.

According to one aspect of the present invention, a system is provided for initiating peer-to-peer communications via a network bus. The system includes a bus controller in electrical communication with the network bus for controlling communications on the network bus. In this regard, the bus controller is capable of transmitting commands onto the network bus. The system also includes at least one network device in electrical communication with the network bus, where the network devices collectively comprise at least first and second data channels. The first data channel is configured for Surrogate operation and includes an initiator command and a surrogate command. In addition, at least the first data channel that is configured for Surrogate operation can further include at least one surrogate control code indicating a predetermined amount of data, an initial piece of data, and/or an order of a predefined amount of data. When the bus controller transmits a command onto the network bus that matches the initiator command of the first data channel, at least the second data channel is capable of executing the initiator command and at least the first data channel is capable of subsequently executing the respective surrogate command to thereby permit peer-to-peer communications between at least the first and second data channels. Also, when the bus controller transmits a command addressed to at least the first data channel that is configured for Surrogate operation that matches the respective initiator command, at least the first data channel is capable of executing the command and thereafter executing the respective surrogate command.

More particularly, according to one embodiment, the network devices include a first network device comprising the data channel configured for Surrogate operation and including a "Read Data" initiator command and a "Write Data" surrogate command. Thus, when the bus controller transmits a "Read Data" command addressed to the second data channel, the second data channel is capable of executing the "Read Data" command by reading data onto the network bus. In this regard, the first network device can comprise both the configured first data channel and the second data channel. Also, when the bus controller transmits a "Read Data" command addressed to the second data channel, the first data channel of the first network device is capable of executing the "Write Data" surrogate command by writing the data from the network bus.

According to another embodiment, the network devices include a first network device comprising the first data channel configured for Surrogate operation and including a "Trigger" initiator command and a "Read Data" surrogate command. The network devices also include the second network device comprising the second data channel that is also configured for Surrogate operation and including a "Trigger" initiator command and a "Write Data" surrogate command. In this embodiment, when the bus controller transmits a "Trigger" command, the configured first data channel of the first network device is capable of executing the "Read Data" surrogate command by reading data onto the network bus. Similarly, the configured second data channel of the second network device is capable of executing the "Write Data" surrogate command by writing the data from the network bus. Also, when the bus controller transmits a "Trigger" command addressed to a group of data channels including the configured first and second data channels of the first and second network devices, the configured first data channel of the first network device is capable of executing the "Trigger" command followed by the "Read Data" surrogate command. And the configured second data channel of the second network device is capable of executing the "Trigger" command followed by the "Write Data" surrogate command.

According to yet another embodiment, the network devices include a first network device comprising the first data channel configured for Surrogate operation and including a "Trigger" initiator command, a "Read Data" surrogate command and a surrogate control code specifying a predetermined amount of data. In this embodiment, the network devices also include at least one second network device comprising at least one second data channel that is also configured for Surrogate operation and including a "Trigger" initiator command, a "Write Data" surrogate command and a surrogate control code collectively specifying the predetermined amount of data and individually indicating a initial piece of data.

Thus, when the bus controller transmits a "Trigger" command, the configured first data channel of the first network device is capable of executing the "Read Data" surrogate command by reading the predetermined amount of data onto the network bus. Similarly, the configured second data channels of the second network devices are capable of executing the "Write Data" surrogate command by writing the predetermined amount of data from the network bus with each data channel starting with the respective initial piece of data. Also, when the bus controller transmits a "Trigger" command addressed to a group of data channels including the configured first and second data channels of the first and second network devices, the configured first data channel of the first network device is capable of executing the "Trigger" command followed by the "Read Data" surrogate command. In turn, the configured second data channels of the second network devices are capable of executing the "Trigger" command followed by the "Write Data" surrogate command.

According to a further embodiment, the network devices include a first network device comprising a plurality of first data channels configured for Surrogate operation and including "Trigger" initiator commands, "Read Data" surrogate commands and surrogate control codes collectively specifying a predetermined amount of data and individually indicating an order of execution of the surrogate command. In this embodiment, the network devices also include at least one second network device comprising at least one second data channel configured for Surrogate operation and including a "Trigger" initiator command, a "Write Data" surrogate command and a surrogate control code collectively specifying the predetermined amount of data and individually indicating an initial piece of data.

In operation, then, when the bus controller transmits a "Trigger" command, the configured first data channels of the first network device are capable of executing the "Read Data" surrogate command in the indicated order of execution to thereby read the predetermined amount of data onto the network bus. And the configured second data channels of the second network devices are capable of executing the "Write Data" surrogate command by writing the predetermined amount of data from the network bus with each data channel starting with the respective initial piece of data. Also, when the bus controller transmits a "Trigger" command addressed to a group of data channels including the configured first and second data channels of the first and second network devices, the configured first data channels of the first network device is capable of executing the "Trigger" command followed by the "Read Data" surrogate command. Similarly, the configured second data channels of the second network devices are capable of executing the "Trigger" command followed by the "Write Data" surrogate command.

A network device and a method of establishing peer-to-peer communications are also provided.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As discussed briefly above and in greater detail below, the present invention provides systems and methods for establishing peer-to-peer communications in a network system. Importantly, the systems and methods of the present invention configure at least one group of network devices that are connected to the network bus to at least partially communicate without interdiction from the bus controller to thereby permit more efficient communication, such as in the case of streaming audio or video signals.

At the outset, it is important to note that the systems, network devices and methods of the present invention may be implemented in any type of network system. The network system may be resident in an aircraft, spacecraft, vehicle, building, factory, or any other packages, structures, or environment. As examples, the systems, network devices and methods of the present invention may be implemented in a network system resident on a rotary-wing aircraft, in which the network includes a plurality of sensors, actuators, etc. all connected to a common network bus for communication with a bus controller to determine performance, status, etc., concerning the various components of the aircraft. For example the network devices can include sensors for monitoring strain, acceleration, and pressure of the aircraft's main rotor system.

The systems, network devices and methods of the present invention may also be implemented in a network system in a vehicle such as an automobile in which the network system includes sensors and actuators connected to different components of the vehicle. For example, the network devices can include sensors for monitoring the throttle position, the oil pressure, the water temperature, the transmission fluid pressure, the seat position, the antilock brake system, the suspension, the passive restraint system and the steering system, to name but a few. Alternatively, the network devices may include an actuator for performing a particular function in response to a command from the bus controller. In the automotive application, for example, the network devices can include actuators for controlling the throttle position, the anti-lock brake system, the suspension, the passive restraint system and the active suspension system, to name but a few.

Still further, the network devices may include an audio or video source. In this regard, the network devices can include radio receivers, tape cassette players, compact disc players, cellular telephone receivers or other audio sources for providing audio signals, including, in some instances, streaming audio signals, to the network bus. Correspondingly, the network devices can include speakers, headphone jacks or the like for receiving audio signals from the network bus and for providing a corresponding audible output. Similarly, network devices can include a television receiver, a video cassette player or other video source for providing video signals, including streaming video signals, to the network bus. Accordingly, network devices can include a video monitor or the like for receiving the video signals and for displaying images based upon the video signals.

It is also understood that the present invention may be used in any particular protocol and network structure without departing from the invention. In one advantageous embodiment, however, the systems, network devices and methods of the present invention are implemented in the protocol and network structure described in U.S. patent application Ser. No. 09/735,146, entitled: Network Device Interface for Digitally Interfacing Data Channels to A Controller via A Network, filed on Dec. 12, 2000 and U.S. patent application Ser. No. 09/736,878, entitled: Bus controller for Digitally Controlling Remote Devices via A Common Bus, filed on Dec. 14, 2000, the contents of both of which are incorporated herein by reference. This protocol and network structure offers many advantages over many conventional digital networks.

Specifically, as discussed previously, many existing digital networks operate according to complicated protocols which require each network device to have a relatively high level processor. This, in turn, may increase the cost of the network devices. Further, the high level protocol may introduce overhead into the messages on the bus that can severely limit the number of data samples that can be transmitted on the bus. These networks also generally do not support both acquisition and control, and they typically only support networks that extend over relatively short lengths. Further, these networks typically have bulky network device interfaces, slow network data rates and/or a low network device count. Additionally, many computer systems that include digital networks do not operate in a time-deterministic manner, and as such, lack the capability to schedule a trigger command to the network components that repeats or is interpreted and executed with any precision timing.

In light of these shortcomings with conventional digital network systems, the digital network structure and protocol of U.S. patent application Ser. Nos. 09/735,146 and 09/736,878 use a low-level instruction set allowing less complicated devices to be implemented. The newly developed network system and protocol also allows for increased data rates and uses a command structure that allows for precision timing data acquisition or other actions on the network bus.

Although the present invention may be employed in conjunction with a variety of network architectures, the functions of the present invention are added to the existing command structure of the foregoing network structure and protocol, according to one advantageous embodiment of the present invention. In this embodiment, the system, methods, and functions of the present invention are implemented in the digital network structure and protocol of U.S. patent application Ser. Nos. 09/735,146 and 09/736,878. Specifically, the commands described below may be implemented with the same structure as those of the protocol, and the communication structure is the same.

Figure 1:
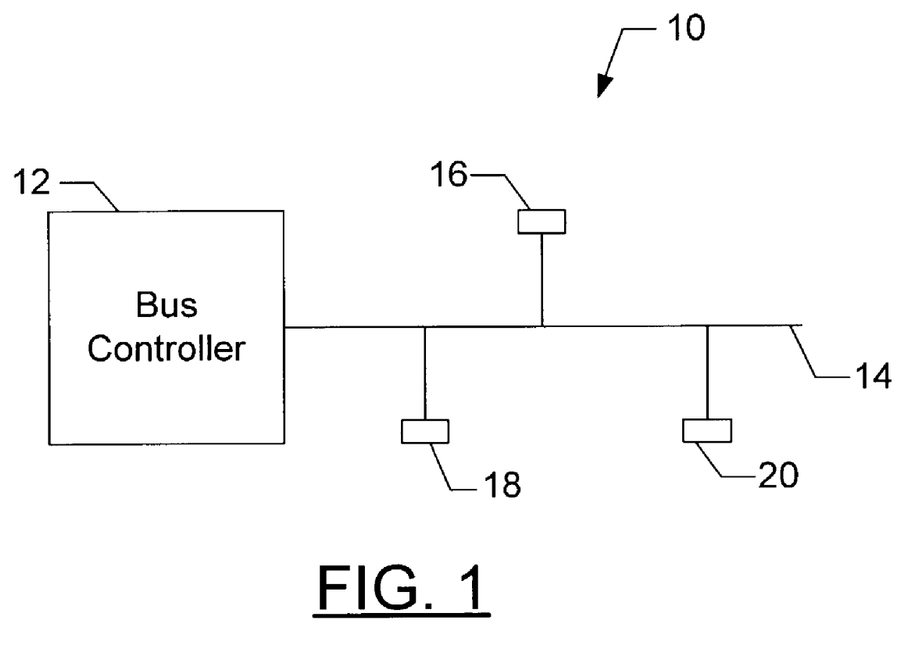
FIG. 1 is a block diagram of a general network system in which the system and method of the present invention may be implemented.

With reference to FIG. 1, a generalized network system in which the present invention may be implemented is illustrated. Specifically, FIG. 1 illustrates a common network system 10 having a host computer or bus controller 12, a network bus 14, and a number of network devices 16–20. In this configuration, the bus controller typically provides configuration and control of the network 10. Further, the individual network devices include assigned identifiers or addresses that uniquely define the network devices on the bus. In operation, the bus controller typically sends commands via the network bus to the network devices, along with the address of the network device or network devices that are supposed to follow the command. The network device or devices designated by the address sent with the command perform the actions associated with the command and may respond by placing data on the network bus to be sent to either the bus controller or another network device. Additionally, or alternatively, the network device or devices designated may respond to a command, such as a trigger command, by initiating an incoming data measurement in a network device, such as a sensor, or move a value to an output in a network device, such as an actuator.

In some embodiments, one or more network devices may include a network device interface (NDI), not illustrated, connected to the network 10. The NDI is used in embodiments in which transducers, whether sensors or actuators, cannot communicate directly with the bus controller 12. The NDI receives and interprets commands from the bus controller and controls signal conditioning, such as receiving data from sensors or activating actuators, based on the commands and data from the bus controller. The NDI may include a block of stack or first-in-first-out (FIFO) memory for storing the data and/or messages from the sensors and/or actuators. In this embodiment, the bus controller is capable of pushing data on or popping data off of the top the stack memory. Also, the NDI can receive, format and send data from the signal conditioning devices to the bus controller. As the present invention is focused on peer-to-peer communications between network devices 16–20, the various embodiments below do not mention the communication between the bus controller and NDI, but instead depict the network device as communicating with the bus controller. It must be understood that in some embodiments, the network devices will include needed components to properly communicate with the bus controller, while in other embodiments, the network device will be associated with an NDI. As such, the various communications of the network devices discussed below may be performed by either the network device or an NDI associated with the network device. A complete detailed disclosure of such an NDI is provided in U.S. patent application Ser. No. 09/736,878.

Each network device 16–20 and/or NDI (including the bus controller 12) generally contains a set of memory, referred to as a Transducer Electronic Data Sheet (TEDS), that stores configuration and calibration data. Some of the memory areas included within the TEDS are not changeable by the user. Other areas are mandatory user areas for data such as logical and group addresses, discussed below, and an ASCII description area, and yet other areas are not mandatory. In addition, each network device and/or NDI can include one or more data channels, with each data channel separately addressed, as described below. Thus, a network device and/or an NDI having multiple data channels can separately communicate via each data channel. In this regard, although many functions will be described in terms of network devices, such functions can more particularly be performed by one or more data channels within the network devices, without departing from the spirit and scope of the present invention.

Because the bus controller 12 connects to the network devices 16–20 via a common network bus 14, the bus controller does not require dedicated connections to each network device to control the network 10. The bus controller instead uses an addressing scheme to assign and control each of the network devices. To operate the network, each network device or, in embodiments in which one or more network devices include multiple data channels, each data channel is assigned one or more addresses, including one or more logical addresses, global addresses and, if configured, one or more group addresses. A logical address is an address recognized by a single network device, or a single data channel within a network device, that the bus controller uses to direct a command, or request, to a particular network device or channel. A global address, on the other hand, is an address recognized by all of the network devices on the network which the bus controller uses to exchange universal data and commands. For example, the global address scheme permits the bus controller to universally initialize or reset all of the network devices. A group address is an address that can be recognized by a particular group of network devices on the network which the bus controller can use to exchange group data and commands. For example, the group address scheme permits the bus controller to set up time deterministic triggers for groups of network devices at various sample rates. Additionally, as described below, the group address scheme can permit groups of network devices to establish peer-to-peer communications on the network bus without interdiction from the bus controller.

As stated, the global address is used for the exchange of global data and commands. The group address is an address that can be recognized by multiple network devices 16–20 and can be used for the exchange of data and commands to a group or subset of network devices on the network 10. Associated with the group address is a group mask stored in the network device. The group mask of one embodiment is a 16-bit word, representing 16 predetermined network addresses, where each bit set to "1" represents an address of the group that the remote device belongs.

As an example, in one embodiment, the global address is assigned as 0000hex. In this embodiment, if the bus controller 12 transmits the address 0000hex, all of the network devices 16–20 will follow the command. Further, in one embodiment, the group addresses are selected in the range of 0001hex to 000fhex, representing the range available in the network device's group mask. In this embodiment, when the bus controller transmits an address in this range to a network device, the network device will compare the group address with the group mask it has stored. If the bit in the group mask corresponding to the group address is set, the network device will interpret and follow the command associated with the group address. For example, if the network device has the group mask 1000000001100bin stored, the network device belongs to group addresses 000fhex, 0003hex, and 0002hex. The bus controller typically uses global and group addresses for service commands, triggering, resetting the system or testing the network 10, as well as establishing peer-to-peer communications.

As discussed, some network systems are used in conjunction with processes desiring communication between network devices without interdiction from a bus controller. For example, some network systems may include network devices comprising source devices or including source data channels, such as audio or video sources, that would operate in a most efficient manner by communicating directly with other network devices comprising receiving devices. In this regard, as described above, the network devices 16–20 can include source devices such as radio receivers, tape cassette players, compact disc players, cellular telephone receivers or other audio sources for providing audio signals, including, in some instances, streaming audio signals, to the network bus 14. Additionally, or alternatively, the network devices can include source devices such as a television receiver, a video cassette player or other video source for providing video signals, including streaming video signals, to the network bus.

To receive signals, such as streaming audio signals, from the network bus and provide a corresponding output, the network system can include network devices comprising receiving devices or including receiving data channels, such as speakers, headphone jacks or the like. Similarly, to receive signals, such as streaming video signals, and display images based upon the video signals, the network devices can include a video monitor or the like.

For example purposes, FIGS. 2–6 illustrate the network system of FIG. 1 integrated into an automobile. The network system 10 of this embodiment, includes a bus controller 12 (shown in FIG. 1) connected to a network bus 14 for controlling communications on the network bus. The network system further includes at least two network devices 16 and 18 (a first network device 16 and a second network device 18), such as sensors, actuators, multimedia devices, etc, for performing different functions on the automobile. Importantly, the first and second network devices can be configured to perform operations, such as sending and receiving data, via the network bus without interdiction from the bus controller, hereinafter referred to as Surrogate operation. As indicated above, each network device can include one or more data channels. Thus, as shown, for example, each network device comprises three data channels (designated CH 1, CH 2 and CH 3), where each data channel includes a unique logical address and can further include a group address.

In a conventional operation, the first network device 16 could communicate with the second network device 18 through individual commands from the bus controller 12. In this regard, the bus controller could transmit a trigger command via the network bus 14 to all of the channels of the first and second network devices by transmitting the trigger command to a group address common to all of the data channels of the first and second network devices. Upon receipt of the trigger command from the network bus, the source data channels of the network devices would input data and hold the data in a register. At the same time, the receiving data channels of the network devices would output data held in registers within the receiving data channels. For example, if the bus controller transmitted a trigger command to group address "1," a network device having group address 1 and comprising a cassette player could input data, such as an audio data sample from a loaded cassette tape, and network devices comprising sets of stereo speakers, also having group address 1, could output data currently stored within the speakers, such as an audio data sample in the form of an audible output.

Following the trigger command in the conventional operation, the bus controller 12 could transmit a read command indicating an amount of data to a source data channel using the logical address of the source data channel. As used herein, the term "read" will be used to designate data read from the perspective of the network bus 14. For example, the bus controller could transmit a read command to the cassette player by transmitting a read in-data, double word, address 24. Upon receipt of the read command, the cassette player, having logical address 24, would read in two words (e.g., 32-bits) of data (e.g., audio data samples previously input to the cassette player from the cassette tape) onto the network bus, which the bus controller would then receive off of the network bus.

Following receipt of the data, the bus controller 12 could transmit a write command to one or more receiving data channels followed by the data to be written. Similar to the read command, as used herein the term "write" will be used to designate data written from the perspective of the network bus. In this regard, the write command could indicate the amount of data to write from the network bus 14, and indicate the desired receiving channels according to either the logical address in the case of one receiving device, or group address in the case of multiple receiving channels. For example, the bus controller could transmit a write out-data, double word, address 42 to command one set of left and right speakers having logical address 42 to write two words of data from the network bus. The bus controller could alternatively transmit the same command to group address 1 to command the sets of speakers having group address 1 to write two words of data from the network bus.

By requiring the communication between the source data channel and receiving data channels to proceed through the bus controller 12, the communication requires a large number of steps and, thus, a large amount of processing time. In this regard, the systems and methods of the present invention provide for communication directly between data channels without proceeding through the bus controller. To allow for direct communication between data channels, the data channels can be configured for Surrogate operation. As described below, within each data channel so configured, Surrogate operation causes the data channels to perform a command operation (referred to as a surrogate command) in place of, or after, a preconfigured command (referred to as an initiator command) issued by the bus controller. The configuration can be accomplished in any number of manners but, in a preferred embodiment, a flag enabling Surrogate operation is stored within the network device along with one or more initiator commands, one or more corresponding surrogate commands with supporting arguments, and surrogate control codes with supporting data, as described below. For example, the enabling flag, initiator commands, surrogate commands, and surrogate control codes can be stored in a predetermined source register included within the TEDS of the network devices, or within a surrogate processing module 22, shown in FIGS. 2–6 and described below.

Figure 2:
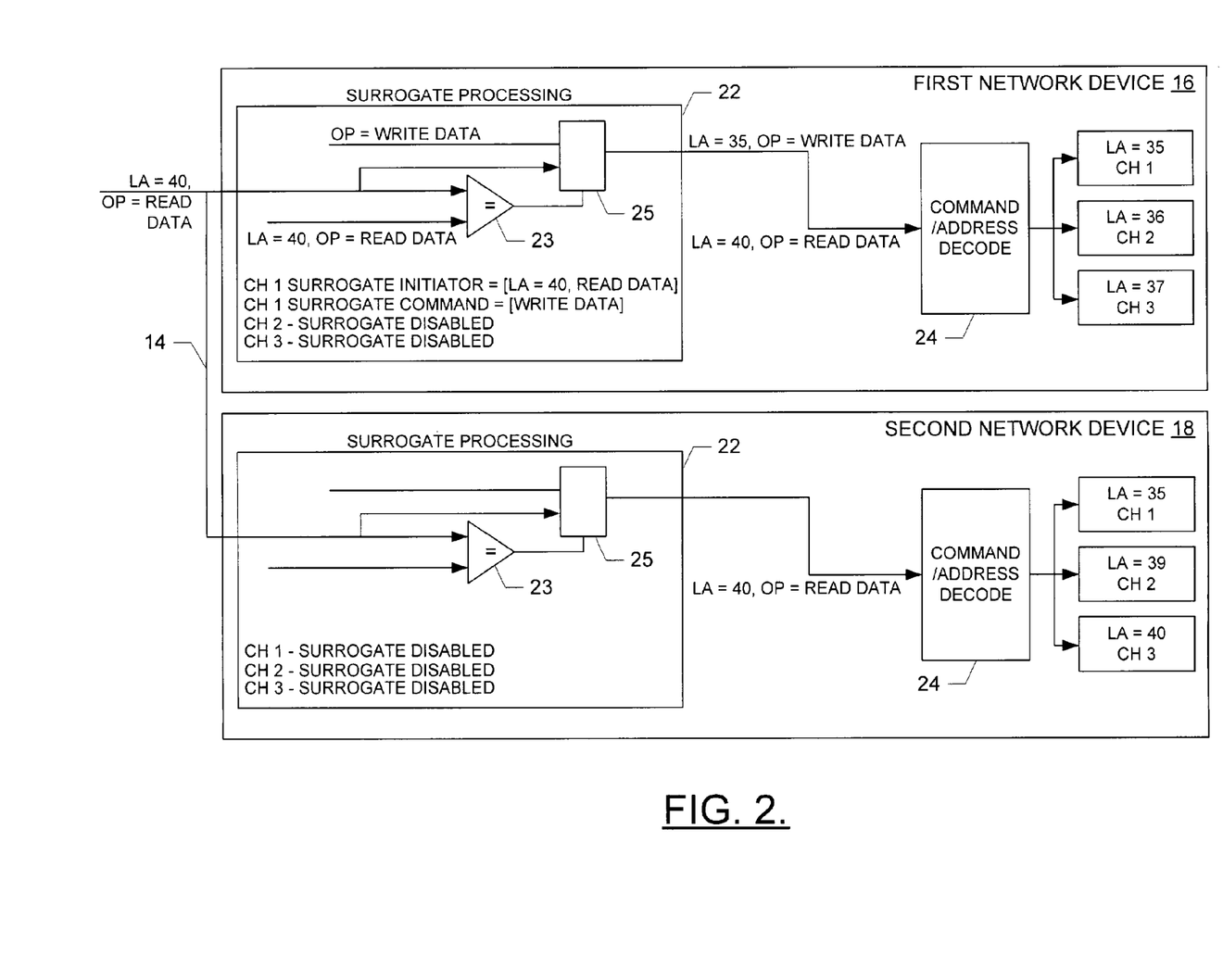
FIGS. 2–6 are operational control flow block diagrams of two network devices in a network system in which various embodiments of the systems and methods of the present invention may be implemented.

The initiator commands specify which commands issued on the network bus 14 initiate the surrogate operation within the respective data channels. In this regard, each initiator command comprises a command or operation (OP), and can also include a logical address (LA) or group address (GA) of a data channel that will execute the command, which does not necessarily correspond to the configured data channel. For example, as shown in FIG. 2, the first data channel (CH 1) of the first network device 16 is preconfigured with an initiator command "Read Data" and an associated logical address LA of 40, which corresponds to the third data channel (CH 3) of the second network device 18. In this regard, by preconfiguring the initiator command of CH 1 of the first network device to include the logical address of CH 3 of the second network device, the respective data channels can be configured to communicate with one another without interdiction from the bus controller 12. The surrogate commands are the commands that are executed by the respective data channel after execution of the initiator command has been completed. As shown in FIG. 2, for example, CH 1 of network device 16 is configured with the surrogate command "Write Data," which corresponds to writing data from the network bus 14.

The surrogate control codes and supporting data that are stored by the network devices with data channels configured for Surrogate operation define how the data following the initiator command is to be parsed. In this regard, when a data channel detects a valid initiator command, the data channel then checks the surrogate control code to determine how the following data block should be parsed. The data channel then extracts the necessary data for processing. Although any one of a number of control options for data parsing can exist, in one embodiment, each data channel is configured for one of four control options. According to the first option, a block of words is captured with the size of the block typically designated by a network block command. In this option, the surrogate control code typically only indicates that the entire block indicated by the network command will be captured. In the second option, a single word is captured from a data block, thereby requiring the word number to be specified in the surrogate control code.

Figure 5:
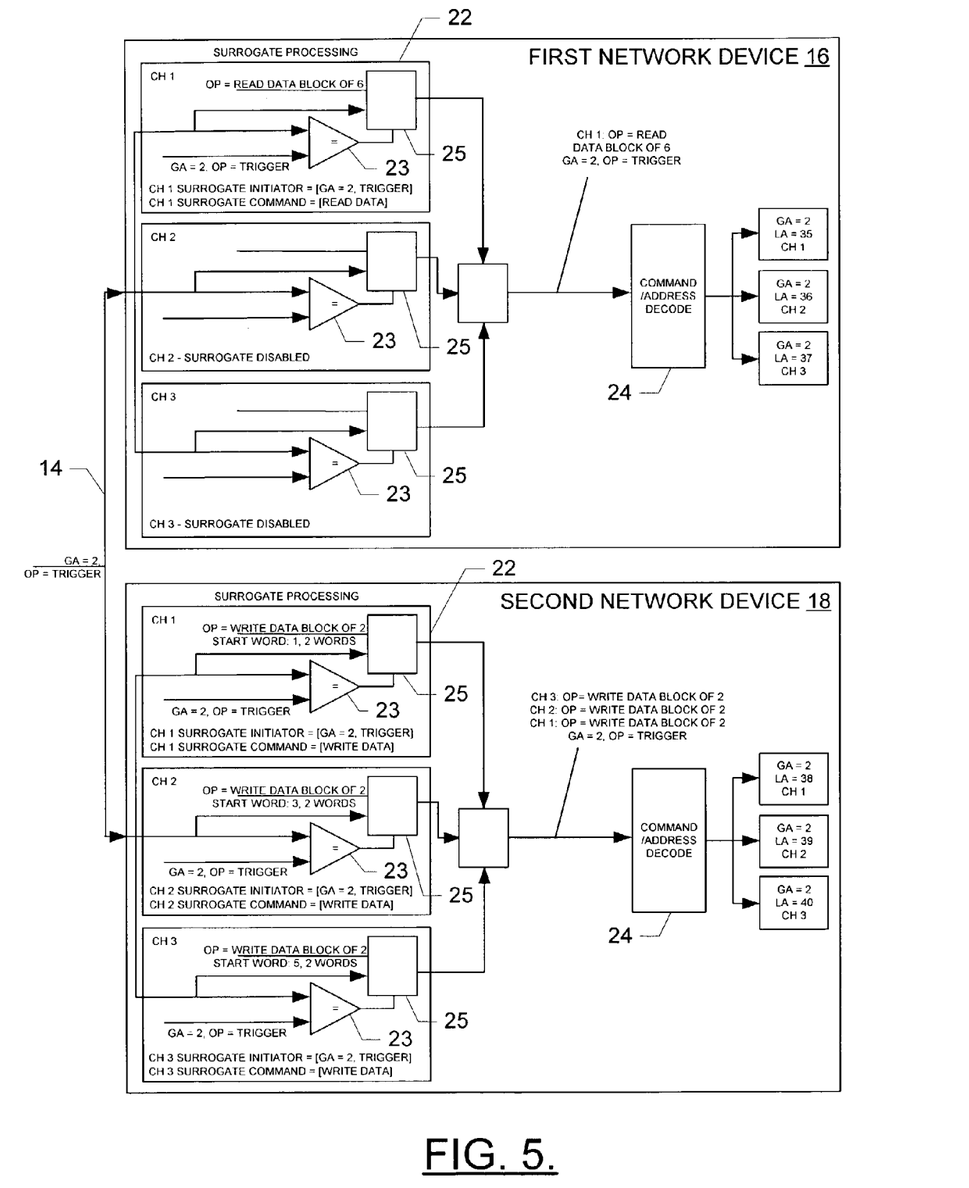
Figure 6:
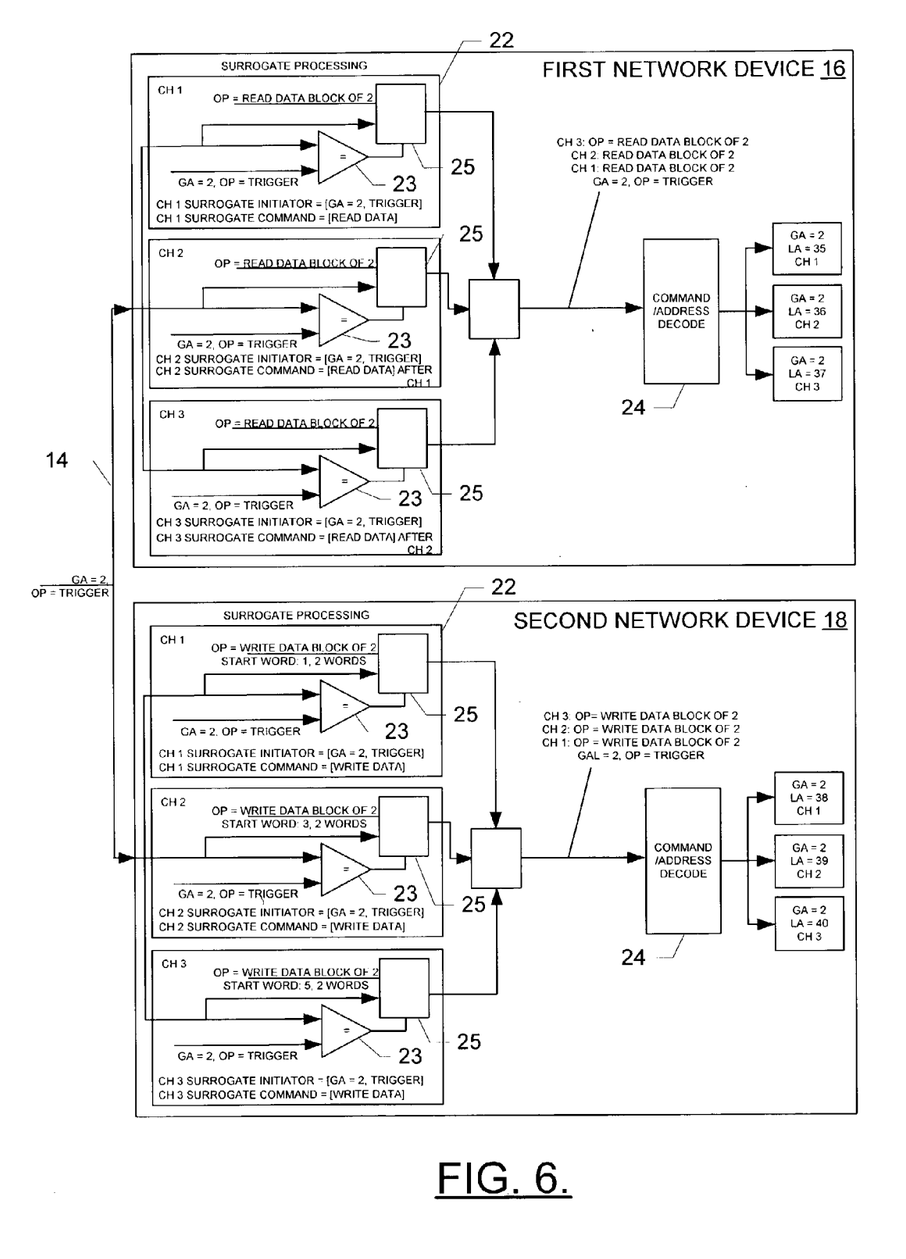

The third option allows a sub-block of words within a block of words to be captured, and requires the number of words in the sub-block and the word number of the sub-block starting location (i.e., the initial piece of data) to be specified in the surrogate control code, as shown in FIGS. 5 and 6 in the second network device 18. And the fourth option allows specific non-consecutive words to be captured, and requires a data set mask and data set size to be specified in the surrogate control code. In this regard, the data set mask can contain a bit for each word to be captured, and the data set size specifies how often the mask should be repeated. For example, if the data set mask has bits 0 and 5 set and the data set size is specified as 8, then the 1st, 6th, 9th, 14th, 17th, 22nd, 25th and 30th, etc. words would be captured until the entire block of words has been scanned.

Once the data channels of the first and second network devices 16 and 18 are configured for Surrogate operation, a surrogate processing module 22 of each network device will monitor the network bus 14 for commands or operations (OP), along with any arguments, matching the initiator commands and arguments stored in the respective network device, such as within the TEDS or surrogate processing module 22. The surrogate processing module can comprise any of a number of different processors, but preferably comprises a low level processor or application specific integrated circuit (ASIC). In this regard, FIGS. 2–6 notionally illustrate various operational elements of the surrogate processing module, including a comparator 23 capable of comparing commands on the network bus with the initiator commands of the data channels. The surrogate processing module also includes a gate 25, responsive to the comparator, that is capable of transmitting the respective surrogate command to the respective data channel when the surrogate processing element detects a command on the network bus matches the initiator command.

When a network device detects a command and address on the network bus 14 that matches the initiator command and address of a data channel of the network device, the network device responds by inserting the preprogrammed surrogate command and optional arguments, if necessary, within the command processing pipeline of the network device. If the command on the network bus that matches the initiator command and address, and is addressed to the network device through the device's logical address LA or group address GA, then the network device will execute the command followed by the preprogrammed surrogate command. However, if the command on the network bus matches the initiator command and address, but is not addressed to the network device through the logical address LA or group address GA, the network device will only execute the preprogrammed surrogate command, typically following the reception of the command on the network by another network device.

For Surrogate operation between the first and second network devices 16 and 18, many different scenarios can occur where the data channels of the network devices communicate with one another according to the present invention. In this regard, FIGS. 2–6 illustrate five such scenarios, which will now be described.

As shown in FIG. 2, the first channel (CH 1) of the first network device 16 has been programmed with the initiator command "Read Data" addressed to logical address (LA) 40, and with the surrogate command "Write Data." As also shown, Surrogate operation for each of the remaining channels of the first network device, as well as all channels for the second network device 18, have been disabled. Now, presume the bus controller 12 issues the command "Read Data" to LA=40 on the network bus 14. The first network device, recognizing the command issued by the bus controller matches the initiator command of CH 1, responds by placing the surrogate command for CH 1 (i.e., LA=35, OP="Write Data") into the command processing pipeline of the first network device. It will be appreciated that logical address is appended as the address for the command "Write Data" because, as shown, CH 1 has the logical address 35.

It will also be appreciated that the network command (i.e., LA=40, OP="Read Data") is also placed in the device's command processing pipeline in advance of the surrogate command, although no data channel within the first network device 16 will respond to the network command because none of the data channels of the first network device include the logical address 40. However, by placing the network command in advance of the surrogate command in the command processing pipeline of the first network device, the subsequent execution of the surrogate command by the first network device will be appropriately timed relative to other activities on the network bus 14, as described below. In this regard, as the network command passes through the first network device, the network command also passes through the other network devices connected to the network bus, namely the second network device 18. And as the second network device includes a third channel (CH 3) that has logical address 40, the command will pass to CH 3 of the second network device, such as via command/address decode module 24, which will respond by reading data onto the network bus. It is noted, however, that he second network device need not know that the network command is an initiator command, but may, instead, execute the command in the same fashion as any other similarly addressed command on the network bus.

When the surrogate command to logical address 35 is subsequently decoded and passed to CH 1 of the first network device 16, such as by command/address decode module 24. Upon receipt, then, CH 1 responds to the surrogate command "Write Data" by writing data from the network bus 14. And as CH 3 of the second network device 18 previously responded to the network command by reading data onto the network bus, the data CH 1 of the first network device reads from the network bus is preferably the same data read onto the network bus by CH 3. Thus, by essentially commanding CH 3 of the second network device to read data onto the network bus, communication occurs between CH 3 and CH 1 of the first network device without having the bus controller separately command CH 1 to write data from the network bus.

Figure 3:
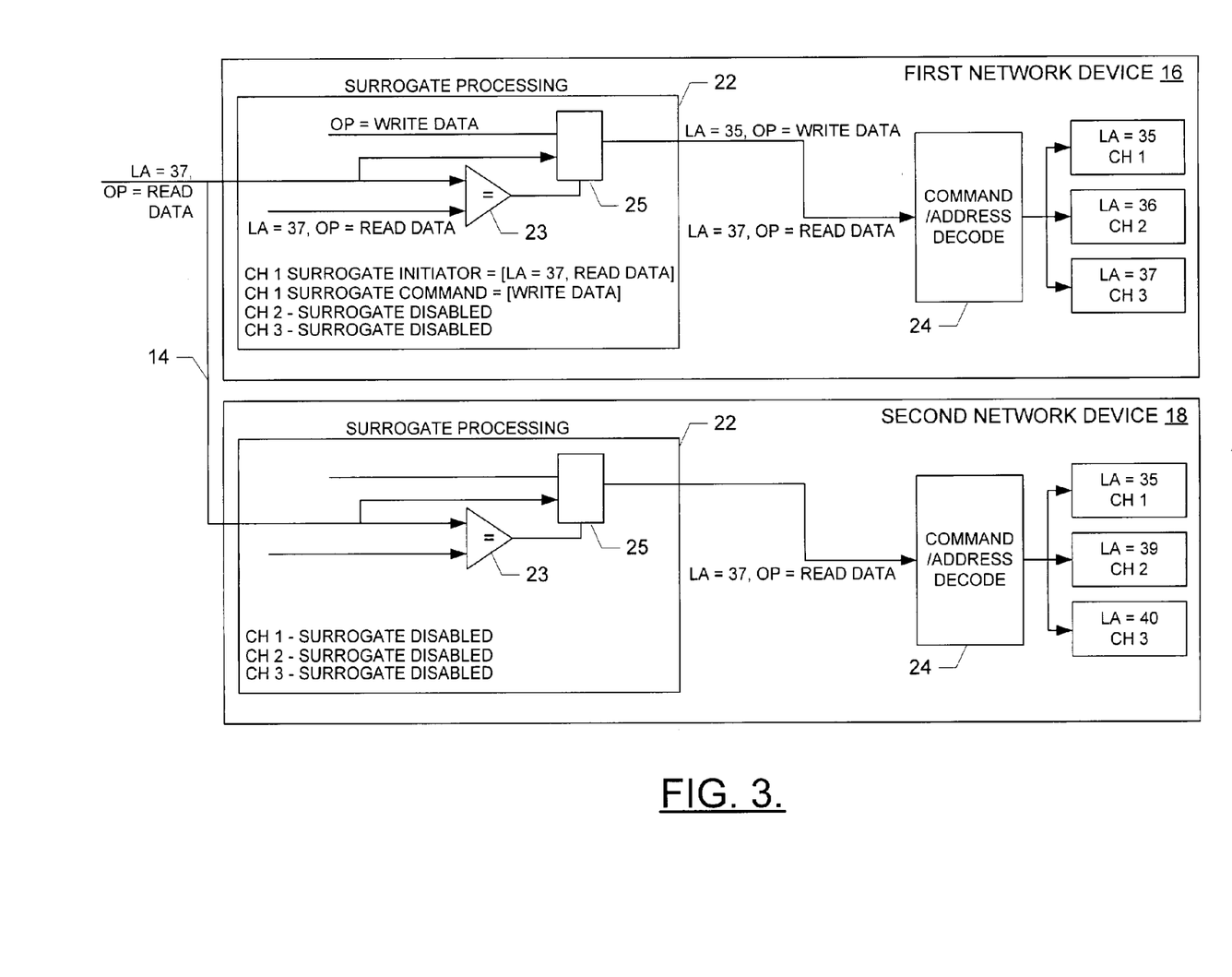

Reference is now drawn to FIG. 3, which illustrates another Surrogate operation scenario. Like the scenario illustrated in FIG. 2, the first channel (CH 1) of the first network device 16 has been programmed with the initiator command "Read Data" and with the surrogate command "Write Data." Also like the scenario of FIG. 2, Surrogate operation for each of the remaining channels of the first network device, as well as all channels for the second network device 18, have been disabled. Unlike the scenario of FIG. 2, however, the initiator command to CH 1 of the first network device includes the logical address (LA) 37, which corresponds to CH 3 of the first network device.

Now presume the bus controller 12 issues the command "Read Data" to LA=37 on the network bus 14. The first network device 16, recognizing the command issued by the bus controller matches the initiator command of CH 1, responds by placing the surrogate command for CH 1 (i.e., LA=35, OP="Write Data") into the command processing pipeline of the first network device. It will be appreciated that logical address 35 is appended as the address for the command "Write Data" because, as shown, CH 1 has the logical address 35. Before placing the surrogate command for CH 1 into the command processing pipeline, however, the first network device also places the network command (i.e., LA=37, OP="Read Data") in the command processing pipeline. And in contrast to the scenario of FIG. 2, the third data channel (CH 3) within the first network device will respond to the network command because CH 3 includes the logical address 37.

The "Read Data" command will pass to CH 3 (LA=37) of the first network device 16, such as via command/address decode module 24. Upon receipt, CH 3 will respond by reading data onto the network bus. Then, when the surrogate command "Write Data" to logical address 35 is passed to CH 1 of the first network device, such as by command/address decode module 24, CH 1 will respond by writing data from the network bus 14. And as CH 3 responded to the network command by reading data onto the network bus, the data CH 1 reads from the network bus is preferably the same data read onto the network bus by CH 3. Thus, by essentially commanding CH 3 of the second network device 18 to read data onto the network bus, communication can occur between CH 3 and CH 1 within the same network device without further interdiction by the bus controller 12.

Figure 4:
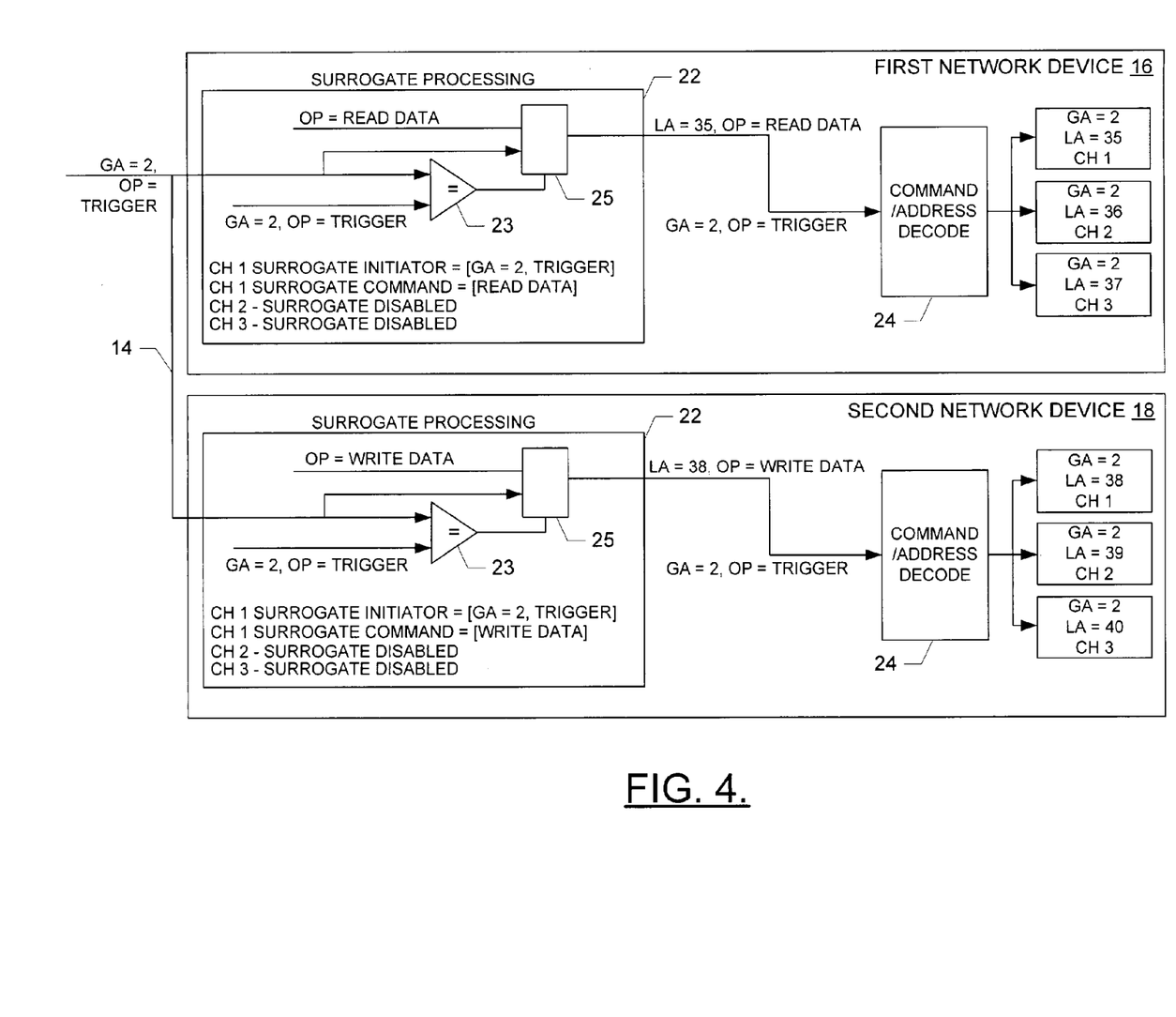

Referring now to FIG. 4, a third scenario for Surrogate operation is provided. As shown, CH 1 of the first network device 16 and CH 1 of the second network device 18 are both configured with the surrogate initiator command "Trigger" addressed to group address (GA) 2. The surrogate command configured for CH 1 of the first network device comprises the command "Read Data," while the surrogate command configured for CH 1 of the second network device comprises the command "Write Data." Note that CH 1 of both network device also include group address 2. Thus, CH 1 of both network devices are capable of performing two commands in response to a single command (i.e., the initiator command).

As shown in FIG. 4, in operation, presume a "Trigger" command to group address 2 is transmitted onto the network bus 14 by the bus controller 12. As all channels of the first and second network devices 16 and 18 belong to group address 2, each channel will respond to the trigger command, such as by obtaining a data measurement if the channel is associated with a sensor channel, or by moving a value to an output if the data channel is associated with an actuator. And when the network devices detect that the command matches the initiator command for the respective first channels (CH 1), the network devices will also pass the respective surrogate commands to the respective first channels, albeit following the "Trigger" command. In this regard, in addition to executing the "Trigger" command, CH 1 of the first network device will also perform a "Read Data" command, as configured, by reading data onto the network bus. Similarly, CH 1 of the second network device will execute the "Trigger" command, and also perform a "Write Data" command. The overall affect of the scenario illustrated in FIG. 4 is that by issuing one "Trigger" command, CH 1 of the first network device performs a "Trigger" and a "Read Data" command, which causes CH 1 of the first network device to read data onto the network bus, which data CH 1 of the second network device writes from the network bus after performing its own "Trigger" command.

Referring now to FIG. 5, yet another scenario of Surrogate operation is shown. As illustrated, CH 1 of the first network device 16, and CH 1, 2 and 3 of the second network device 18, are all configured with initiator commands of "Trigger" to group address (GA) 2. In the first network device, the surrogate command for CH 1 comprises the "Read Data" command, and the surrogate control codes specify a data block of six words. As shown, the control codes are appended to the surrogate command transmitted to CH 1. It will be appreciated, however, that although not illustrated with the initiator command and surrogate command associated with CH 1, the surrogate control codes are stored in memory within or associated with the surrogate processing module 22 along with the initiator command and surrogate command. In the second network device, the surrogate command for CH 1, 2 and 3 each comprise the "Write Data" command. The surrogate control codes for CH 1, 2 and 3 each specify 2 words, with the control code for CH 1 further specifying a start word 1, the control code for CH 2 further specifying a start word 3, and the control code for CH 3 further specifying a start word of 5. Similar to the control codes for CH 1 of the first network device, although not illustrated with the initiator command and surrogate command associated with CH 1, 2 and 3 of the second network device, the surrogate control codes are stored in memory within or associated with the surrogate processing module 22 along with the initiator command and surrogate command for the respective channel.

In the scenario illustrated in FIG. 5, presume the bus controller 12 transmits a "Trigger" command to group address 2 via the network bus 14. As before in the scenario of FIG. 4, as all of the channels of the first and second network devices 16 and 18 include group address 2, all of the channels will execute the "Trigger" command upon receipt from the network bus. In addition, the first network device will recognize that the "Trigger" command to group address 2 matches the initiator command of CH 1. As such, after passing the "Trigger" command to CH 1, 2 and 3 (members of group address 2), the first network device will pass the surrogate command, "Read Data" block of 6 words, to CH 1. In response, after executing the "Trigger" command, CH 1 of the first network device will respond to the surrogate command by reading a data block of 6 words onto the network bus.

Similarly, upon receipt of the "Trigger" command from the network bus 14, the second network device 18 will recognize that the "Trigger" command to group address 2 matches the initiator command for CH 1, 2 and 3. Thus, after passing the "Trigger" command to CH 1, 2 and 3 (members of group address 2), the second network device will pass the surrogate commands to the respective channels. Thus, the second network device will pass to CH 1 the surrogate command, "Write Data" start word 1, block of 2 words, pass to CH 2 the surrogate command, "Write Data" start word 3, block of 2 words, and pass to CH 3 the surrogate command, "Write Data" start word 5, block of 2 words. The effect of such an operation is that by issuing the Trigger command, CH 1 of the first network device 16 executes the trigger command (along with CH 2 and 3 of the first network device) and reads six words of data onto the network bus. In turn, CH 1, 2 and 3 of the second network device each execute the trigger command and thereafter write two words (of the six words read by CH 1 of the first network device) off the network bus. By appropriately staggering the start words, however, CH 1, 2 and 3 of the second network device collectively write six words off the network bus with CH 1 writing the first two words, CH 2 writing the third and fourth words, and CH 3 writing the last two words.

Now, reference is drawn to FIG. 6, which illustrates a further scenario for Surrogate operation among the first and second network devices 16 and 18. Similar to the scenario of FIG. 5, CH 1 of the first network device, and CH 1, 2 and 3 of the second network device, are all configured with initiator commands of "Trigger" to group address (GA) 2. Also, similar to the scenario of FIG. 5, in the second network device, the surrogate command for CH 1, 2 and 3 each comprise the "Write Data" command. The surrogate control codes for CH 1, 2 and 3 of the second network device each specify 2 words, with the control code for CH 1 further specifying a start word 1, the control code for CH 2 further specifying a start word 3, and the control code for CH 3 further specifying a start word of 5. In contrast to the scenario of FIG. 5, however, each channel of the first network device is configured for Surrogate operation, where each includes the initiating command "Trigger" to group address 2. Also, each channel of the first network device includes the surrogate command "Read Data" with a control code specifying 2 words. To enable the channels to read contiguous data onto the network bus, the control code of CH 2 of the first network device further specifies that the "Read Data" command be executed after CH 1 executes the "Read Data" command. Similarly, the control code of CH 3 of the first network device further specifies that the "Read Data" command be executed after CH 2 executes the "Read Data" command. Similar to the scenario of FIG. 5, the control codes in FIG. 6 are shown appended to the surrogate command transmitted to the respective channels. It will be appreciated, however, that although not illustrated with the initiator command and surrogate command associated with the channels, the surrogate control codes are stored in memory within or associated with the surrogate processing module 22 along with the initiator command and surrogate command of the respective channel.

In the scenario illustrated in FIG. 6, then, presume the bus controller 12 transmits a "Trigger" command to group address 2 via the network bus 14. As before in the scenario of FIGS. 4 and 5, as all of the channels of the first and second network devices 16 and 18 include group address 2, all of the channels will execute the "Trigger" command upon receipt from the network bus. In addition, the first network device will recognize that the "Trigger" command to group address 2 matches the initiator command of CH 1, 2 and 3. As such, after passing the "Trigger" command to CH 1, 2 and 3 (members of group address 2), the first network device will pass the surrogate command, "Read Data" block of 2 words, to CH 1. In response, after executing the "Trigger" command, CH 1 of the first network device will respond to the surrogate command by reading a data block of 2 words onto the network bus. After CH 1 executes the "Read Data" command, the first network device will pass the surrogate command "Read Data" block of 2 words to CH 2 for execution. And upon execution of the "Read Data" command by CH 2, the first network device will pass the surrogate command "Read Data" block of 2 words to CH 3, which will respond by reading 2 words onto the network bus.

Similar to the scenario of FIG. 5, upon receipt of the "Trigger" command from the network bus 14, the second network device 18 will recognize that the "Trigger" command to group address 2 matches the initiator command for CH 1, 2 and 3. Thus, after passing the "Trigger" command to CH 1, 2 and 3 (members of group address 2), the second network device will pass the surrogate commands to the respective channels. Thus, the second network device will pass to CH 1 the surrogate command, "Write Data" start word 1, block of 2 words, pass to CH 2 the surrogate command, "Write Data" start word 3, block of 2 words, and pass to CH 3 the surrogate command, "Write Data" start word 5, block of 2 words. The effect of such an operation is that by issuing the Trigger command, CH 1, 2 and 3 of the first network device 16 execute the trigger command and then each read two words of data onto the network bus. In turn, CH 1, 2 and 3 of the second network device each execute the trigger command and thereafter write two words off the network bus in sequence. In this manner, the words written off of the network bus by CH 1, 2 and 3 of the second network device are the same words read onto the network bus by CH 1, 2 and 3 of the first network device, respectively.

Although the illustrated scenarios depict one first network device 16 and one second network device 18, it should be understood that the network system can include any number of network devices capable of performing Surrogate operation without departing from the spirit and scope of the present invention. For example, the scenario of FIG. 5 can include two additional second network devices that each include one or more channels. In this regard, Surrogate operation of CH 2 and 3 of the depicted second network device could be disabled. In turn, one of the channels of one of the additional network devices could be configured for Surrogate operation similar to the originally configured CH 2, and one of the channels of the other additional network device could be configured for Surrogate operation similar to the originally configured CH 3. Thus, in operation, in performing the Surrogate operation in the second network devices, a channel of each second network device is capable of writing a data block of two words, with each writing the blocks indicated by the respective start word.

With respect to embodiments where one or more data channels are configured with a "Trigger" initiator command, it should be understood that the data read onto the network bus by the data channels can comprise the data input by data channels associated with sensors in response to the "Trigger" command, particularly when the amount of data input equals the amount of data configured in the surrogate control codes for the respective channels. Similarly, the data output by data channels associated with actuators in response to the "Trigger" command can comprise the data written from the network bus by the data channels, particularly when the amount of data output equals the amount of data configured in the surrogate control codes for the respective channels. In a preferred embodiment, however, the data channels include, or are otherwise associated with a first-in-first-out (FIFO) memory. In this regard, the amount of data read onto the network bus and the amount of data written from the network bus preferably comprise data stored in the FIFO memory of the respective data channels. Thus, the amount of data input by the channels associated with sensors is thereafter stored in the FIFO memory of the respective data channels for subsequent reading onto the network bus. Similarly, the amount of data written from the network bus by data channels associated with actuators is thereafter stored in the FIFO memory of the respective data channels for subsequent output by the actuators. Therefore, the data input by the data channels associated with sensors and thereafter read onto the network bus, and the data written from the network bus and thereafter output by data channels associated with actuators, can be cycled in and out of the source respective data channels in a time-deterministic manner.

Therefore, various embodiments of the present invention provide systems, network devices and methods for initiating peer-to-peer communications in a network system. Embodiments of the present invention allow the network devices to communicate in a peer-to-peer fashion in a fewer number of operations than conventional systems and methods and, thus, requires less time to complete than the conventional systems and methods. In this regard, the data channels of the network devices are capable of peer-to-peer communications via a common network bus without dedicated wiring, as some conventional network systems require. Additionally, the systems and methods of various embodiments of the present invention allow network devices to communicate without interdiction from a bus controller.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for initiating peer-to-peer communications via a network bus, said system comprising:
   a bus controller in electrical communication with the network bus for controlling communications on the network bus, wherein said bus controller is capable of transmitting commands onto the network bus; and
   at least one network device in electrical communication with the network bus, wherein said at least one network device collectively comprise at least first and second data channels, wherein the first data channel is configured for Surrogate operation by including an initiator command and a surrogate command,
   wherein when said bus controller transmits a command onto the network bus that matches the initiator command of the first data channel, at least the second data channel is capable of executing the initiator command and at least the first data channel is capable of subsequently executing the respective surrogate command to thereby permit peer-to-peer communications between at least the first and second data channels.

2. A system according to claim 1, wherein when said bus controller transmits a command addressed to at least the first data channel that is configured for Surrogate operation that matches the respective initiator command, at least the first data channel is capable of executing the command and thereafter executing the respective surrogate command.

3. A system according to claim 1, wherein at least the first data channel that is configured for Surrogate operation further includes at least one surrogate control code indicating at least one of a predetermined amount of data, an initial piece of data, and an order of a predefined amount of data.

4. A system according to claim 1, wherein the at least one network device includes a first network device comprising the first data channel configured for Surrogate operation and including a "Read Data" initiator command and a "Write Data" surrogate command, wherein when said bus controller transmits a "Read Data" command addressed to the second data channel, the second data channel is capable of executing the "Read Data" command by reading data onto the network bus, and the first data channel of the first network device is capable of executing the "Write Data" surrogate command by writing the data from the network bus.

5. A system according to claim 4, wherein the first network device comprises both the configured first data channel and the second data channel.

6. A system according to claim 1, wherein the at least one network device includes a first network device comprising the first data channel configured for Surrogate operation and including a "Trigger" initiator command and a "Read Data" surrogate command, wherein the at least one network device also includes a second network device comprising the second data channel that is also configured for Surrogate operation and includes a "Trigger" initiator command and a "Write Data" surrogate command, wherein when said bus controller transmits a "Trigger" command, the configured first data channel of the first network device is capable of executing the "Read Data" surrogate command by reading data onto the network bus, and the configured second data channel of the second network device is capable of executing the "Write Data" surrogate command by writing the data from the network bus.

7. A system according to claim 6, wherein when said bus controller transmits a "Trigger" command addressed to a group of data channels including the configured first and second data channels of the first and second network devices, the configured first data channel of the first network device is capable of executing the "Trigger" command followed by the "Read Data" surrogate command, and the configured second data channel of the second network device is capable of executing the "Trigger" command followed by the "Write Data" surrogate command.

8. A system according to claim 1, wherein the at least one network device includes a first network device comprising the first data channel configured for Surrogate operation and including a "Trigger" initiator command, a "Read Data" surrogate command and a surrogate control code specifying a predetermined amount of data, wherein the at least one network device also includes at least one second network device comprising at least one second data channel that is also configured for Surrogate operation and includes a "Trigger" initiator command, a "Write Data" surrogate command and a surrogate control code collectively specifying the predetermined amount of data and individually indicating an initial piece of data, wherein when said bus controller transmits a "Trigger" command, the configured first data channel of the first network device is capable of executing the "Read Data" surrogate command by reading the predetermined amount of data onto the network bus, and the configured second data channels of the second network devices are capable of executing the "Write Data" surrogate command by writing the predetermined amount of data from the network bus with each data channel starting with the respective initial piece of data.

9. A system according to claim 8, wherein when said bus controller transmits a "Trigger" command addressed to a group of data channels including the configured first and second data channels of the first and second network devices, the configured first data channel of the first network device is capable of executing the "Trigger" command followed by the "Read Data" surrogate command, and the configured second data channels of the second network devices are capable of executing the "Trigger" command followed by the "Write Data" surrogate command.

10. A system according to claim 1, wherein the at least one network device includes a first network device comprising a plurality of first data channels configured for Surrogate operation and including "Trigger" initiator commands, "Read Data" surrogate commands and surrogate control codes collectively specifying a predetermined amount of data and individually indicating an order of execution of the surrogate command, wherein the at least one network device also includes at least one second network device comprising at least one second data channel that is also configured for Surrogate operation and includes a "Trigger" initiator command, a "Write Data" surrogate command and a surrogate control code collectively specifying the predetermined amount of data and individually indicating an initial piece of data, wherein when said bus controller transmits a "Trigger" command, the configured first data channels of the first network device are capable of executing the "Read Data" surrogate command in the indicated order of execution to thereby read the predetermined amount of data onto the network bus, and the configured second data channels of the second network devices are capable of executing the "Write Data" surrogate command by writing the predetermined amount of data from the network bus with each data channel starting with the respective initial piece of data.

11. A system according to claim 10, wherein when said bus controller transmits a "Trigger" command addressed to a group of data channels including the configured first and second data channels of the first and second network devices, the configured first data channels of the first network device are capable of executing the "Trigger" command followed by the "Read Data" surrogate command, and the configured second data channels of the second network devices are capable of executing the "Trigger" command followed by the "Write Data" surrogate command.

12. A method of initiating peer-to-peer communications in a network comprising at least one network device communicating via a common network bus and collectively having at least first and second data channels including at least a first data channel configured for Surrogate operation, wherein at least the first data channel configured for Surrogate operation includes an initiator command and a surrogate command, said method comprising:

transmitting at least one command onto the network bus;

detecting a command on the network bus that matches the initiator command of at least the first data channel;

executing the initiator command via at least the second data channel; and thereafter executing the respective surrogate command via at least the first data channel to thereby permit peer-to-peer communications between at least the first and second data channels.

13. A method according to claim 12 farther comprising configuring at least the first data channel for surrogate operation before transmitting the at least one command.

14. A method according to claim 13, wherein configuring at least the first data channel comprises configuring at least the first data channel to further include at least one surrogate control code indicating at least one of a predetermined amount of data, an initial piece of data, and an order of a predefined amount of data.

15. A method according to claim 12, wherein transmitting at least one command comprises includes transmitting a command addressed to at least the first data channel configured for Surrogate operation, wherein detecting a command comprises detecting the command addressed to at least the first data channel, and wherein the method further comprises executing the initiator command via at least the first data channel before executing the respective surrogate command.

16. A method according to claim 12, wherein the at least one network device includes a first network device comprising the first data channel configured for Surrogate operation and including a "Read Data" initiator command and a "Write Data" surrogate command, wherein transmitting at least one command comprises transmitting a "Read Data" command addressed to the second data channel, wherein executing the respective surrogate command comprises executing the "Write Data" surrogate command by writing the data from the network bus, and wherein the method further comprises executing the "Read Data" command before executing the "Write Data" surrogate command by reading data onto the network bus.

17. A method according to claim 12, wherein the at least one network device includes a first network device comprising the first data channel configured for Surrogate operation and including a "Trigger" initiator command and a "Read Data" surrogate command, wherein the at least one network device also includes a second network device comprising the second data channel that is also configured for Surrogate operation and including a "Trigger" initiator command and a "Write Data" surrogate command, wherein transmitting at least one command comprises transmitting a "Trigger" command, wherein executing the respective surrogate command comprises executing the "Read Data" surrogate command via the configured first data channel of the first network device by reading data onto the network bus, and executing the "Write Data" surrogate command via the configured second data channel of the second network device by writing the data from the network bus.

18. A method according to claim 17, wherein transmitting the "Trigger" command comprises transmitting the "Trigger" command addressed to a group of data channels including the configured first and second data channels of the first and second network devices, wherein the method further comprises executing the "Trigger" command via the configured first data channel of the first network device before executing the "Read Data" surrogate command via the configured first data channel of the first network device, and executing the "Trigger" command via the configured second data channel of the second network device before executing the "Write Data" surrogate command via the configured second data channel of the second network device.

19. A method according to claim 12, wherein the at least one network device includes a first network device comprising the first data channel configured for Surrogate operation and including a "Trigger" initiator command, a "Read Data" surrogate command and a surrogate control code specifying a predetermined amount of data, wherein the at least one network device also includes at least one second network device comprising at least one second data channel that is also configured for Surrogate operation and including a "Trigger" initiator command, a "Write Data" surrogate command and a surrogate control code collectively specifying the predetermined amount of data and individually indicating an initial piece of data, wherein transmitting at least one command comprises transmitting a "Trigger" command, wherein executing the respective surrogate command comprises executing the "Read Data" surrogate command via the configured first data channel of the first network device by reading the predetermined amount of data onto the network bus, and executing the "Write Data" surrogate command via the configured second data channels of the second network devices by writing the predetermined amount of data from the network bus with each data channel starting with the respective initial piece of data.

20. A method according to claim 19, wherein transmitting the "Trigger" command comprises transmitting a "Trigger" command addressed to a group of data channels including the configured first and second data channels of the first and second network devices, wherein the method further comprises executing the "Trigger" command via the configured first data channel of the first network device before executing the "Read Data" surrogate command via the configured first data channel of the first network device, and executing the "Trigger" command via the configured second data channels of the second network devices followed by the "Write Data" surrogate command via the configured second data channels of the second network devices.

21. A method according to claim 12, wherein the at least one network device includes a first network device comprising a plurality of first data channels configured for Surrogate operation and including "Trigger" initiator commands, "Read Data" surrogate commands and surrogate control codes collectively specifying a predetermined amount of data and individually indicating an order of execution of the surrogate command, wherein the at least one network device also includes at least one second network device comprising at least one second data channel that is also configured for Surrogate operation and including a "Trigger" initiator command, a "Write Data" surrogate command and a surrogate control code collectively specifying the predetermined amount of data and individually indicating an initial piece of data, wherein transmitting at least one command comprises transmitting a "Trigger" command, wherein executing the respective surrogate command comprises executing the "Read Data" surrogate command via the configured first data channels of the first network device in the indicated order of execution to thereby read the predetermined amount of data onto the network bus, and executing the "Write Data" surrogate command via the configured second data channels of the second network devices by writing the predetermined amount of data from the network bus with each data channel starting wit the respective initial piece of data.

22. A method according to claim 21, wherein transmitting the "Trigger" command comprises transmitting a "Trigger" command addressed to a group of data channels including the configured first and second data channels of the first and second network devices, wherein the method further comprises executing the "Trigger" command via the configured first data channels of the first network device before executing the "Read Data" surrogate command via the configured first data channel of the first network device, and executing the "Trigger" command via the configured second data channels of the second network devices before executing the "Write Data" surrogate command via the configured data second channels of the second network devices.

23. A network device capable of peer-to-peer communications via a network bus, the network device comprising:
a first data channel configured for Surrogate operation;
a memory capable of storing an initiator command and a surrogate command associated with the first data channel; and
a surrogate processing module capable of detecting a command on the network bus that matches the initiator command, wherein when said surrogate processing module detects a command on the network bus that matches the initiator command, said surrogate processing module is capable of transmitting the surrogate command to said first data channel such that at least a second data channel is capable of executing the initiator command and said first data channel is thereafter capable of executing the surrogate command to thereby permit peer-to-peer communications between at least the first and second data channels.

24. A network device according to claim 23, wherein when said surrogate processing module detects a command on the network bus that is also addressed to said first data channel, said first data channel is capable of executing the command and thereafter executing the respective surrogate command.

25. A network device according to claim 23, wherein said memory is further capable of storing at least one surrogate control code indicating at least one of a predetermined amount of data, an initial piece of data, and an order of a predefined amount of data.

26. A network device according to claim 23 further comprising a second data channel, said wherein said memory is capable of storing a "Read Data" initiator command and a "Write Data" surrogate command, wherein when a "Read Data" command addressed to the second data channel is transmitted via the network bus, said second data channel is capable of executing the "Read Data" command by reading data onto the network bus, and said first data channel of the first network device is capable of executing the "Write Data" surrogate command by writing the data from the network bus.

27. A network device according to claim 23, wherein said memory is capable of storing a "Trigger" initiator command and a "Read Data" surrogate command, wherein when said surrogate processing module detects a "Trigger" command on the network bus, said surrogate processing is capable of transmitting the "Read Data" surrogate command to said first data channel such that said first data channel is capable of executing the "Read Data" surrogate command by reading data onto the network bus.

28. A network device according to claim 27, wherein when said surrogate processing module detects a "Trigger" command addressed to at least said first data channel, said first data channel is capable of executing the "Trigger" command before executing the "Read Data" surrogate command.

29. A network device according to claim 23, wherein said memory is capable of storing a "Trigger" initiator command, a "Read Data" surrogate command and a surrogate control code specifying a predetermined amount of data, wherein when said surrogate processing module detects a "Trigger" command on the network bus, said surrogate processing is capable of transmitting the "Read Data" surrogate command to said first data channel such that said first data channel is capable of executing the "Read Data" surrogate command by reading the predetermined amount of data onto the network bus.

30. A network device according to claim 29, wherein when said surrogate processing module detects a "Trigger" command addressed to at least said firm data channel, said first data channel is capable of executing the "Trigger" command before executing the "Read Data" surrogate command.

31. A network device according to claim 23, wherein the network device comprises a plurality of first data channels configured for Surrogate operation, wherein said memory device is capable of storing "Trigger" initiator commands, "Read Data" surrogate commands and surrogate control codes for said first data channels collectively specifying a predetermined amount of data and individually indicating an order of execution of the surrogate command, wherein when said surrogate processing module detects a "Trigger" command on the network bus, said surrogate processing is capable of transmitting the "Read Data" surrogate commands to said first data channels such that said first data channels are capable of executing the "Read Data" surrogate command in the indicated order of execution to thereby read the predetermined amount of data onto the network bus.

32. A network device according to claim 31, wherein when said surrogate processing module detects a "Trigger" command addressed to at least said first data channel, said first data channels are capable of executing the "Trigger" command before executing the "Read Data" surrogate command.

33. A system according to claim 1, wherein at least the second data channel and at least the first data channel are capable of executing the initiator command and the respective surrogate command, respectively, in response to said bus controller transmitting the command that matches the initiator command.

34. A system according to claim 1, wherein said bus controller and said at least one network device are separated and in electrical communication via the network bus.

35. A method according to claim 12, wherein executing the initiator command and executing the respective surrogate command occur in response to detecting the command on the network bus that matches the initiator command.

36. A network device according to claim 23, wherein said surrogate processing module is capable of transmitting the surrogate command in response to detecting the command on the network bus that matches the initiator command.

* * * * *